June 1, 1948.  D. J. MYNALL  2,442,612
OSCILLATOR
Filed Oct. 19, 1945
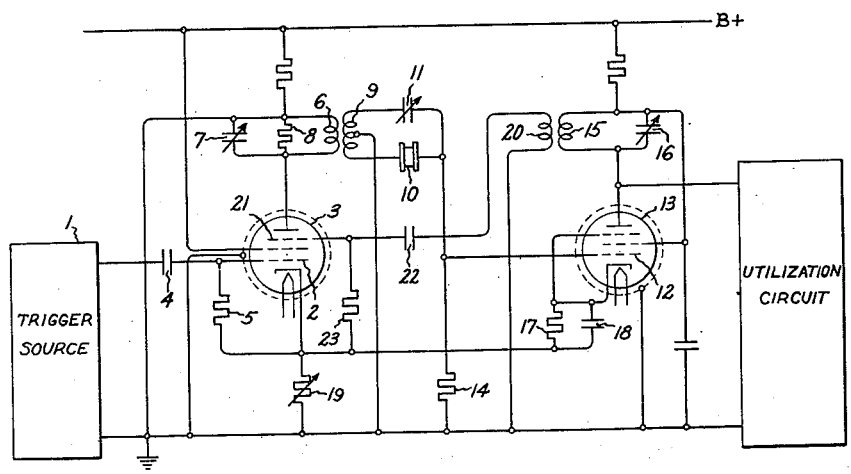
Inventor:
Dennis J. Mynall,
by  Merton D. Morse
His Attorney.

Patented June 1, 1948

2,442,612

UNITED STATES PATENT OFFICE 2,442,612

OSCILLATOR

Dennis J. Mynall, Rugby, England, assignor to General Electric Company, a corporation of New York Application October 19, 1945, Serial No. 623,385
In Great Britain December 19, 1941

Section 1, Public Law 690, August 8, 1946
Patent expires December 19, 1961

5 Claims. (Cl. 250—36)

This invention relates to a circuit arrangement employing thermionic valves for producing trains of substantially sinusoidal oscillations, the duration of each train of oscillations being short compared with the period between the trains. It is required that the initiation of the trains of oscillations be effected by means of timing impulses.

The object of the invention is to provide a circuit arrangement by which the trains of oscillations can be generated with accurate frequency determination on the receipt of the initiating impulse.

A circuit arrangement for producing trains of substantially sinusoidal oscillations according to the invention comprises a thermionic valve having in its anode circuit an inductance, a circuit coupled inductively thereto by means of a coil having an intermediate tapping point held at a fixed potential and containing a crystal which when energized from the inductance oscillates at the frequency of the oscillations to be produced, and an amplifying valve to a control grid of which are passed voltages resulting from the oscillations of the crystal, the crystal-containing circuit being so arranged that the shunt capacitance of the crystal is balanced with respect to the said point by added capacity so that exciting oscillations originating in the inductance do not reach the control grid of the amplifying valve, and the arrangement being such that each train of oscillations is generated by utilizing part of the energy stored in the inductance when the valve is suddenly rendered non-conductive by applying a negative voltage impulse to a grid thereof to cause shock excitation of the crystal circuit.

For applications where it is required that the oscillations should terminate after they have existed for a predetermined time period so as to separate the trains of oscillations from one another, a negative feed-back may be obtained from the output of the amplifying valve and be applied to the grid of the first valve, the feedback becoming operative on the removal of the negative impulse voltage which has rendered the first valve non-conductive. The feedback energy may be obtained from the secondary winding of a transformer having its primary winding in the anode circuit of the amplifying valve. This anode circuit may be tuned substantially to the frequency of the crystal oscillations.

The build-up time of the oscillations in the tuned anode circuit of the amplifying valve may be reduced by injecting energy into the tuned circuit at the beginning of the train by utilizing the sudden change in current flowing in a cathode resistor common to both valves at the commencement of a train initiated by the negative voltage impulse.

When it is required that the oscillations excited in the crystal circuit should build up with zero time lag means may be provided for passing a portion of the exciting oscillatory energy from the inductance into the crystal circuit so as to add to the crystal oscillations appearing at the grid of the amplifying valve. It will be appreciated that if the anode circuit of the valve is tuned, preferably to the natural frequency of the resonant circuit, the sudden stoppage of the anode current will cause oscillations to be excited in the tuned anode circuit. These oscillations will diminish in amplitude as the oscillations in the resonant circuit increase in amplitude. The energy fed directly to the crystal circuit from the anode circuit may then be made to compensate for the time lag in the building up of the oscillations in the resonant circuit.

A circuit arrangement according to the invention is shown in the accompanying drawing and will now be described.

The arrangement comprises two thermionic valves 3 and 13, of which 3 is a pentode valve and serves to provide excitation for a piezo-electric crystal 10, and wherein 13, also a pentode valve, serves to amplify the crystal oscillations and pass the amplified oscillations to an output terminal connected to a utilization circuit so identified.

A negative, substantially rectangular, pulse of voltage, is supplied from a suitable trigger source 1 and reaches the control grid 2 of the pentode valve 3 through the condenser resistor coupling circuit 4—5. This voltage pulse is sufficiently large to prevent any cathode current flowing in valve 3 during the production of a train of oscillations, hereinafter termed the "range scan." Between range scans, current flows steadily in an inductance 6 in the anode circuit of valve 3. When 3 is rendered non-conductive at the beginning of a range scan, the energy stored in the inductance dissipates itself in a damped sinusoidal oscillation, the oscillatory circuit being composed of the inductance 6, condenser 7 and resistor 8.

A secondary winding 9 coupled to inductance 6 serves to transfer part of the energy to the crystal 10. Mechanical oscillations build up in the crystal for as long as the exciting oscillation lasts. The anode circuit of 3 is tuned to encourage this effect.

The secondary winding 9 is center tapped to earth or point of fixed potential and the capacity 11 is balanced against the shunt capacity of the crystal system 10 so as substantially to prevent the exciting oscillation reaching the control grid 12 of the valve 13. A resistance leak 14 sets the mean potential of the grid 12. If the tapping point is changed, a readjustment of the setting of condenser 11 will be necessary. The piezo-electric voltages developed by the crystal 10 are not balanced to earth and reach the grid 12 of valve 13. These voltages appear in amplified form in the tuned anode circuit of 13, the circuit consisting of inductor 15 and condenser 16. Resistor 17 and condenser 18 provide grid bias for 13, in the usual manner.

A variable resistor 19 is provided, which is common to the cathode circuits of 3 and 13, for a purpose to be described later.

A coil 20, magnetically coupled to 15, serves to convey a portion of the output voltage to the suppressor grid 21 of valve 3, via the condenser leak coupling circuit 22—23. The return circuit to the suppressor grid 21 of valve 3 forms a feedback circuit between range scans, but this circuit is broken during range scans by the suppression of the cathode current of 3. The direction of connection of the magnetically coupled circuits and the proportioning of the circuit elements in the feed-back chain are chosen so that the circuit is stable throughout the frequency spectrum and degenerative at the crystal operating frequency. At the end of the range scan the feed-back circuit comes into operation and damps out the mechanical oscillations of the crystal, which would otherwise continue for a much longer time. The feed-back arrangement to damp the crystal oscillations can be considered as a separate feature from the arrangement made to excite the crystal and may be omitted if the decay time is unimportant.

In the applications for which this circuit is intended the decrement of the crystal oscillations is negligible for the duration of a range scan which is much less than the period between range scans and no special means are needed to maintain the oscillations.

As described so far, the output oscillations take a number of complete periods to build up to a steady state.

The delay in reaching the steady state is due to the energy being fed into the crystal over a number of cycles, and also to the electrical inertia of the tuned circuit 15—16. The effect of the crystal build-up time may be effectively eliminated by moving the setting of the condenser 11 off balance in such a direction as to pass a portion of the exciting oscillations just sufficient to provide a transient effect which compensates for the missing part of the crystal output. This adjustment is simple and permanent. The building-up time of the oscillations in 15—16 is reduced effectively to zero by injecting energy suddenly into the tuned circuit at the beginning of the range scan, the oscillations on the grid of valve 13 having only to maintain these oscillations. This is done by operating on the cathode of valve 13 in the following manner. The variable resistor 19 is adjusted to a value other than zero so that, when valve 3 is cut off at the beginning of the range scan, a negative unit function impulse of voltage is imposed on the cathode of valve 13. There is a particular value of the unit function voltage compared with the oscillations arriving on the grid of valve 13 which gives the correct result. The adjustments of condenser 11 and resistor 19 are very easily made by observing the output voltage.

It is important that the relative amplitudes of the oscillations on the grid of valve 13 and the unit function on its cathode must bear a definite relationship, which should not be upset by such things as valve aging or variations of H. T. line voltage. This condition is met automatically in the following manner. The oscillations on the grid of valve 13 are of an amplitude directly proportional to the value of the anode current of valve 3 at the instant at which it is suddenly reduced to zero. Also, the value of the unit function voltage on the cathode of valve 13 is dependent on the value of the cathode current of valve 3 at the same instant. These two currents, the cathode and anode current of valve 3, are very closely proportional over any range of operating conditions, so that the condition of constant proportionality of the voltages on the grid and cathode of valve 13 is automatically met.

The excitation of the crystal by oscillations of definite periodicity, and the passing of the crystal output through a tuned amplifier, tend to discourage the crystal from oscillating at any frequency other than the main desired frequency and to filter out any undesired frequency if there should be a certain amount in the crystal output. A second function of the tuned circuits is to provide frequency selective elements in the feedback path which are essential if the circuit is to be stable.

A permissible modification of the arrangement described, is to use aperiodic circuits to replace the tuned circuits, the frequency selective elements being removed to the feed-back path alone. This can only be done where it is possible to obtain a crystal which is substantially free from the tendency to oscillate at unwanted frequencies, but it has the advantage that no initial adjustments are required to compensate for transient defects at the beginning of the scan, since there are no such transient effects. It suffers from the possible disadvantage that the output voltage will in general be lower.

The feed-back voltage may also be obtained by a capacity, instead of a transformer, coupling to the anode circuit of valve 13, and may be fed to the control grid of valve 3.

The trains of oscillations generated by the circuit arrangement hereinbefore described may be employed in radio-echo apparatus for determining the distance of an object from the location of the apparatus.

What I claim as new and desire to secure by Letters Patent of the United States is:

1. Apparatus for producing a short train of high frequency oscillations comprising a first, normally conductive electron discharge device having an inductive anode circuit, a second electron discharge having a control electrode, a first network inductively coupling said anode circuit to said control electrode, a piezo-electric crystal resonant at said frequency connected between said anode circuit and said control electrode, said crystal having capacity in shunt therewith tending to provide coupling directly between said anode circuit and said control electrode, means for suddenly reducing the anode current of said first device, thereby to shock-excite said crystal and impress a train of said oscillations on said control electrode, and means to compensate at least partially for the effect of said shunt capacitance comprising a second network coupling said anode circuit to said control electrode through a capacitor in opposing phase relation to the coupling through said shunt capacity.

2. Apparatus for producing recurrent pulses of high frequency oscillations comprising a pair of normally conductive, electron discharge devices, each having an input circuit and a resonant anode circuit tuned to said high frequency, means inductively coupling the anode circuit of said first device to the input circuit of said second device, said means comprising two parallel paths in phase opposition, a piezo-electric crystal in series in one of said paths, said crystal being resonant at said frequency and having shunt capacity, a capacitor in series in the other path, and means for recurrently impressing negative pulses on the input circuit of said first device, thereby to initiate oscillations in the anode circuit of said first device, said capacitor being adjusted to compensate only partially for capacity coupling through said crystal, whereby a fraction of the total oscillatory energy is transmitted directly through said shunt capacity to said output circuit to hasten the build-up of oscillations therein at the beginning of each pulse.

3. Apparatus for producing recurrent pulses of high frequency oscillations comprising a pair of normally conductive, electron discharge devices, each having an input circuit and a resonant anode circuit tuned to said high frequency, means inductively coupling the anode circuit of said first device to the input circuit of said second device, said means comprising two parallel paths in phase opposition, one path serially including a piezo-electric crystal, said crystal being resonant at said frequency and having shunt capacity, the other path serially including a capacitor, means for recurrently impressing negative pulses on the input circuit of said first device, thereby to initiate oscillations in the anode circuit of said first device, said capacitor being adjusted partially to compensate for capacity coupling through said crystal, and degenerative feedback means for impressing oscillations developed in the output circuit of said second device upon said first device, said feedback becoming effective to damp said oscillations at the termination of each of said negative pulses.

4. In combination, a first electron discharge device having an input circuit and an inductive anode circuit, a second electron discharge device having a control electrode and a high frequency resonant output circuit, means coupling said anode circuit to said control electrode, said means comprising piezo-electric crystal resonant at the frequency of said output circuit, means for impressing a negative pulse on said input circuit to excite oscillations in said crystal and said output circuit, and degenerative feedback means for impressing oscillations from said output circuit upon said input circuit.

5. Apparatus for producing a short train of high frequency oscillations comprising, in combination, a pair of electron discharge devices each having an input circuit and a resonant anode circuit tuned to said high frequency, means inductively coupling the anode circuit of said first device to the input circuit of said second device, said means serially including a piezo-electric crystal resonant at said frequency, means for impressing a short negative voltage pulse on the input circuit of said first device, thereby to shock-excite said crystal into oscillation at said frequency, and means comprising a cathode impedance common to both said devices for feeding back oscillations degeneratively to said first device, thereby to damp said oscillations upon the termination of said pulse.

DENNIS J. MYNALL.

REFERENCES CITED

The following references are of record in the file of this patent:

UNITED STATES PATENTS

| Number | Name | Date |
| --- | --- | --- |
| 2,005,083 | Hansell | June 18, 1935 |
| 2,103,090 | Plebanski | Dec. 21, 1937 |
| 2,153,202 | Nichols | Apr. 4, 1939 |
| 2,266,668 | Tubbs | Dec. 16, 1941 |
| 2,355,606 | Shannon | Aug. 15, 1944 |
| 2,397,840 | Crosby | Apr. 2, 1946 |

OTHER REFERENCES

Sherman, Proc. IRE, vol. 28, Sept. 1940, pp. 406–409.